US011992457B2

United States Patent
(12) United States Patent
Baud

(10) Patent No.: US 11,992,457 B2
(45) Date of Patent: May 28, 2024

(54) PROTECTIVE CONTAINERS FOR BIOPHARMACEUTICAL LIQUID BAGS

(71) Applicant: SARTORIUS STEDIM FMT SAS, Aubagne (FR)

(72) Inventor: Stéphane Baud, La Bouilladise (FR)

(73) Assignee: SARTORIUS STEDIM FMT SAS, Aubagne (FR)

( * ) Notice: Subject to any disclaimer, the term of this patent is extended or adjusted under 35 U.S.C. 154(b) by 1088 days.

(21) Appl. No.: 16/652,288

(22) PCT Filed: Sep. 26, 2018

(86) PCT No.: PCT/FR2018/000225
§ 371 (c)(1),
(2) Date: Mar. 30, 2020

(87) PCT Pub. No.: WO2019/068965
PCT Pub. Date: Apr. 11, 2019

(65) Prior Publication Data
US 2020/0237620 A1 Jul. 30, 2020

(30) Foreign Application Priority Data
Oct. 6, 2017 (FR) ...................................... 1771062

(51) Int. Cl.
*A61J 1/16* (2023.01)
*A61J 1/10* (2006.01)
*B65D 77/06* (2006.01)

(52) U.S. Cl.
CPC . *A61J 1/16* (2013.01); *A61J 1/10* (2013.01); *B65D 77/06* (2013.01)

(58) Field of Classification Search
CPC ................ A61J 1/16; A61J 1/10; B65D 77/06
See application file for complete search history.

(56) References Cited

U.S. PATENT DOCUMENTS 5,163,587 A 11/1992 Apps et al.
9,161,527 B2 * 10/2015 Cutting .................... A01N 1/02
2007/0209960 A1 * 9/2007 Leoncavallo ...... B65D 21/0234 220/4.27

(Continued)

FOREIGN PATENT DOCUMENTS

EP 1993921 B1 1/2011
FR 2717782 A1 9/1995

(Continued)

OTHER PUBLICATIONS

Merriam-Webster: chicane, https://www.merriam-webster.com/dictionary/chicane, accessed Nov. 4, 2023. (Year: 2023).*

(Continued)

*Primary Examiner* — Ariana Zimbouski
(74) *Attorney, Agent, or Firm* — Heslin Rothenberg Farley & Mesiti P.C.; Nicholas Mesiti

(57) ABSTRACT

A protective container for a biopharmaceutical liquid bag comprises: a lower shell comprising a bottom and side walls; and an upper shell, said upper shell comprising a recess capable of covering the bag and being insertable in the lower shell, so that the upper shell is retained in the upper part of the side walls of the lower shell by resting on support elements located in the lower shell.

33 Claims, 12 Drawing Sheets

(56) References Cited

U.S. PATENT DOCUMENTS

2015/0166212 A1 6/2015 Wissner et al.

FOREIGN PATENT DOCUMENTS

| | | | | | |
|---|---|---|---|---|---|
| JP | 2001179576 | A | * | 7/2001 | |
| WO | WO-2013053011 | A1 | * | 4/2013 | ........... A01N 1/0236 |
| WO | 2015160348 | A1 | | 10/2015 | |

OTHER PUBLICATIONS

English translation of the Written Opinion of the International Searching Authority for International Application No. PCT/FR2018/000225 mailed on Dec. 3, 2018.
Office Action issued on Oct. 26, 2022 in Chinese Application No. 201880064821.8.
International Search Report (and English translation) and Written Opinion of the International Searching Authority for International Application No. PCT/FR2018/000225 mailed on Dec. 3, 2018.
French Search Report for French Patent Application No. 1771062 dated Aug. 28, 2018.

* cited by examiner

PROTECTIVE CONTAINERS FOR BIOPHARMACEUTICAL LIQUID BAGS

CROSS REFERENCE TO RELATED APPLICATIONS

This application is a national stage filing under section 371 of International Application No. PCT/FR2018/000225, filed on Sep. 26, 2018, published on Apr. 11, 2019 as WO 2019/068965 A1 which claims priority to French Patent Application No. 1771062, filed on Oct. 6, 2017. The entire disclosure of each application is hereby incorporated herein by reference.

The invention relates to the field of protective containers for biopharmaceutical liquid bags, the field of protective assemblies integrating a protective container and a biopharmaceutical liquid bag, as well as the field of methods for assembling a protective assembly integrating a protective container and a biopharmaceutical liquid bag.

BACKGROUND

According to a first prior art, a protective container for biopharmaceutical liquid bags is known comprising, on the one hand, two upper and lower shells assembled on one another, as well as two elastic plastic films located inside these shells and clamping two biopharmaceutical liquid bags. The biopharmaceutical liquid bags are retained in place between the films and protected from encroachments and impacts external to the protective container by spaces respectively retained between, on the one hand, the upper shell and the upper film and, on the other hand, between the lower shell and the lower film. This protective container ensures a good retaining of the biopharmaceutical liquid bags inside. However, this protective container has complex and delicate structural shells, because of the elastic plastic film to be fixed on each of the shells and has a significant volume at the top because of the two empty spaces stacked on one another, that between upper film and upper shell and that between lower film and lower shell.

According to a second prior art, for example presented in patent application EP1993921, a protective container for biopharmaceutical liquid bags is known, comprising on the one hand, two upper and lower shells assembled on one another, and clamps a biopharmaceutical liquid bag. This protective container has, on the one hand, the disadvantage, either insufficient side retention of the biopharmaceutical liquid bag (case where the bag is smaller than the inter-shell available space), or a pressure that is too high, exerted by the shells directly on the biopharmaceutical liquid bag (case where the bag is just sized for the inter-shell available space), due to the constitution of the housing of the bag by the engagement of the two shells together (each shell only defining one part of the housing), and on the other hand, the disadvantage of a difficult mounting requiring the exact and precise superposition of the two shells by the engagement of a pin and bore clearance.

An installation solution with an articulated container closing the installable device is known, by document WO 2015/160348. The lower receptacle of the container itself solely defines the volume for receiving the installable device which is pre-filled with a defined volume to exactly coincide with the housing of the lower receptacle, the upper cover being flat. This type of solution is not very suitable for bags (in particular, bags of volumes greater than one liter) which are typically curved in a filled state. In addition, the receptacle does not make it possible for any adaptation of volume which can be required if there are filling variations from one bag to another.

The present invention improves the situation.

SUMMARY OF THE INVENTION

To this end, it proposes a protective container for a biopharmaceutical liquid bag comprising:

a lower shell comprising a bottom and a side wall, an upper shell:

comprising a recess (single central recess) capable of covering the bag, insertable in the lower shell, such that the upper shell is retained in the upper part of the side wall of the lower shell by resting on support elements located in the lower shell.

Thanks to these arrangements, the biopharmaceutical liquid bag is retained between the walls of the two shells laterally, without excessive constraint of the upper shell. The recess of the upper shell furthermore makes it possible to avoid an articulation of the bag when the two shells are assembled on one another, while protecting the bag from possible impacts. A protective container made of only two parts also makes it possible for a facilitated mounting of the container, and limited production costs.

By “upper part”, this means the part of the wall elements constituting the side wall being located either above halfway up the side walls or above halfway up and around halfway up the side walls.

Optionally, the side wall has a frame format, for example, rectangular or square, possibly rounded in the angles. Typically, the side wall extends annularly about a central axis capable of defining the dimension at the top of the container.

Two upper longitudinal edges in the lower shell and two upper longitudinal edges in the upper shell are typically provided (externally remote with respect to the recess). The longitudinal edges of each pair can be parallel, and preferably rectilinear.

The lower shell side wall has an inner surface and the upper shell has an upper shell side wall having an outer surface, these inner and outer surfaces being equipped with complementary fixing elements. Such complementary fixing elements are designed and arranged to prevent a translation (longitudinal or lateral movement), one with respect to the other, of the lower shell and of the upper shell.

According to an embodiment, the recess has a concave shape facing the bottom of the lower shell.

In this manner, the recess imitates the curved shape of a bag filled with biopharmaceutical liquid, making it possible, on the one hand, to cover a bag containing a significant volume of biopharmaceutical liquid, and on the other hand, that the recess is directly in contact with at least one surface of the bag, so as to wedge the bag between the two shells.

Typically, the side wall of the upper shell includes, or forms insertion and guiding parts being housed (at least partially) in the inner volume of the lower shell (along the side wall of the lower shell). Preferably, the insertion and guiding parts comprise two longitudinal wall elements, parallel to one another, which extend from one longitudinal end to the other of the upper shell, and each extending between a longitudinal upper edge of the upper shell and a lower face (which can be substantially flat, except for a few lugs or local projections which protrude towards the bottom from the plane of this lower face).

According to a particularity, the lower shell has no opening in the side wall thereof and has an annular upper edge, which preferably extends in a longitudinal plane, only the upper shell having an access opening which extends under the upper edge to the assembled state between the shells.

Optionally, the insertion and guiding parts are formed in the side wall of the upper shell so as to continually elongate an inner face of the side wall of the lower shell, at least in an interconnecting region (between the shells), U-shaped, around the housing for the bag.

According to a particularity, the insertion parts consist of an insertion frame, optionally provided with lugs or similar projections protruding towards the bottom of the lower shell.

Optionally, the upper shell has a bottom or bottom part, of which the periphery is connected to the insertion and guiding parts, in order to form the recess; in the assembled state of the shells, the recess has an upper profile such as the height of the recess is increased as the two longitudinal wall elements are extended by approaching a central zone of the bottom or bottom part of the upper shell. It is understood that this makes it possible to increase the height of the bag housing of the container, in a longitudinal median zone equidistant from the two longitudinal wall elements.

According to an embodiment, the support elements are arranged over the periphery of the lower shell.

According to an embodiment, the side walls of the lower shell have cavities forming said support elements, on which peripheral abutments of the upper shell rest.

This helps to better distribute the forces over all of the lower shell, and consequently over all of the protective container.

According to an embodiment, at least three of the four side walls of the lower shell have cavities forming said support elements, on which the peripheral abutments of the upper shell rest.

The three side walls are particularly the two longest side walls, and the rear side wall of the lower shell. These cavities are used, in particular, to rigidify the structure of the lower shell.

According to an embodiment, an inner surface of a side wall of the lower shell and an outer surface of a side wall of the upper shell are equipped with complementary fixing elements preventing a translation of the shells against one another.

In this manner, an unsuitable disengagement of the lower and upper shells is not possible. This also makes it possible to increase the retention of the bag between the two shells.

According to an embodiment, an inner surface of a side wall of the lower shell and an outer surface of a side wall of the upper shell are equipped of complementary fixing elements preventing a vertical translation of the shells against one another.

According to an embodiment, the fixing elements comprise clips.

According to an embodiment, the fixing elements are located on either side of an opening of the protecting container, and/or in an end opposite the opening of the protecting container.

According to an embodiment, an inner surface of a side wall of the lower shell and an outer surface of a side wall of the upper shell are equipped with complementary fixing elements preventing a horizontal translation of the shells against one another.

According to an embodiment, the fixing elements comprise a set of lugs and receptacles engaging together.

According to an embodiment, the upper shell is insertable in the lower shell so as to not exceed outside of the lower shell at the top.

This makes it possible, in particular, to be able to stack several containers on top of one another without losing any space.

According to an embodiment, the upper shell is shorter than the lower shell over at least some of the width thereof, making the inside of the container accessible from the outside, so as to define an opening.

The creation of an opening at the level of the upper shell makes it possible, in particular to obtain a totally sealed lower shell, as it is thus not necessary to provide for an opening at the level of the lower shell. The location of the opening also makes it possible to facilitate access to the inside of the container.

According to an embodiment, a side wall of the lower shell has at least one inclined portion at least at the level of the bottom of the lower shell.

According to an embodiment, the inclined portion is located at the level of a longitudinal end located at the level of the outlet of a bag tube.

According to an embodiment, the bottom of the lower shell is sealed and has a sufficient height to retain a water volume at least equal to 5 liters.

According to an embodiment, the bottom of the lower shell is sealed and has a sufficient height to retain a water volume at least equal to 10 liters.

According to an embodiment, the bottom of the lower shell is sealed and has a sufficient height to retain a water volume at least equal to 20 liters.

According to an embodiment, the bottom of the lower shell is sealed and has a sufficient height to retain a water volume at least equal to 50 liters.

Thus, in combination with the opening located at the level of the lower shell, the inclined portion also makes it possible to improve accessibility to the content of the container from the outside. The inclined portion also has the function of retaining the bag at the level of the front end thereof, by wedging it directly against the inclined portion. Finally, this also makes it possible to make the lower shell sealed, as no opening is necessary on the lower shell. Thus, in case of piercing the bag filled with biopharmaceutical liquid, the lower shell can retain the integrality of the biopharmaceutical liquid without spillage.

The lower shells are furthermore sized to be able to retain 20% of water additional to the water volume which could be retained.

According to an embodiment, the lower shell comprises at least one abutment at the level of a longitudinal end located at the level of the outlet of a bag tube, outer perimeters of the opening of the upper shell coming into contact with said abutment.

According to an embodiment, the abutment comprises rounded edges.

The abutment also makes it possible to ensure contact with the upper shell and with the lower shell. The front end of the bag can also come into contact with the abutment, and the tubes of the bag, passing over the abutment, does not risk being damaged by this contact, due to the rounded edges of the abutment.

According to an embodiment, the upper shell comprises a plurality of cavities capable of receiving and retaining connectors of one end of a tube of the bag.

According to an embodiment, the cavities are arranged on either side of the opening of the upper shell, and/or are arranged at an end opposite the opening.

The cavities integrated directly on the upper shell make it possible for an arrangement of the fully functional container, making it possible to wedge a plurality of connectors without losing any space.

According to an embodiment, the cavities are arranged on either side of the opening of the upper shell but are not arranged at an end opposite the opening, the recess comprising an X-shape.

This embodiment is advantageously used for protective containers which could retain a volume of 5 liters. The X-shape on the upper shell makes it possible to place the tubes of the bag, which are more difficult to arrange in the case of protective containers of a reduced size.

According to an embodiment, when the upper shell is inserted in the lower shell, chicanes are arranged around the recess so as to be able to retain in place around the recess, at least one tube of the bag.

Thanks to these arrangements, the tube(s) can also be stored in the protecting container by being correctly retained in place. This correct retention in place of the tubes also thus improves the retention of the bag with respect to the upper shell which protects it.

According to an embodiment, the upper shell comprises at least one arch, preferably at least two or three arches, extending between two side walls of the upper shell, advantageously between the two longest side walls.

According to an embodiment, the arch comprises a flat upper part, capable of receiving an outer surface of the bottom of a lower shell of another container.

According to an embodiment, the arch bears on the recess of the upper shell.

According to an embodiment, the flat upper part of the arches comprises a protrusion capable of being inserted in a cavity provided on an outer surface of the bottom of a lower shell, still of another container.

In this manner, numerous containers can be stacked on one another, a lower shell of a container bearing on an upper shell of another container. The creation of complementary protrusions and cavities on the lower and upper shells ensures the retention in place of the stacked containers, without requiring additional parts to retain them in place.

According to an embodiment, at least some of the side walls comprise a gripping zone, preferably at least the inclined portion and the end opposite the opening of the lower shell comprise such a gripping zone, this gripping zone advantageously including several cavities spaced from one another.

Thus, the protective container can be easily handled by a controller.

According to an embodiment, the lower shells of different protective containers are capable of being stacked on one another, such that the fixing elements of the highest lower shells rest on the fixing elements of the lowest lower shells.

According to an embodiment, the upper shells of different protecting containers are capable of being stacked on one another, such that the fixing elements of the highest upper shells rest on the fixing elements of the lowest upper shells.

This arrangement helps to better distribute the forces over all of the lower or upper shells, and consequently to avoid a deterioration of the shells when they are stacked. In addition, this also makes it possible to limit the height of the stacks.

According to an embodiment, the two longest side walls of the lower shell are inclined towards one another in the low parts thereof such that, when different protective containers are stacked on one another, a space is formed between two adjacent lower shells along these adjacent lower shells so as to retain the tubes accessible to the hand of an operator.

In this manner, a controller easily has access to the bag tubes when several protective containers are stacked on one another. The space can be sufficiently wide to be able to pass a hand between two adjacent lower shells of two stacked protective containers.

The present invention also aims for a protective assembly of a bag intended to receive a biopharmaceutical liquid comprising:

- a protective container according to one of the preceding claims,
- an empty bag intended to receive biopharmaceutical liquid placed in said protective container, inside the lower shell and covered by the upper shell.

In a variant, it can be provided to place a full bag in the protective container.

According to an embodiment, the bag is retained at the longitudinal ends of the container, such that:

- a front end of the bag abuts against the abutment of the lower shell, and
- the bag folded at an end opposite the outlet of the tube is crimped between the lower and upper shells.

Thus, this avoids the longitudinal articulation of the bag in the container, improving, due to this, the lateral retention of the bag.

The present invention also aims for a method for producing a protective container, wherein:

- the lower and upper shells are produced by thermoforming,
- the perimeters of the lower and upper shells are deburred, there is at least no other cutting step.

The production method comprises no cutting step, thus considerably reducing the production cost. In addition, the protective container only comprising two parts, i.e. the upper and lower shells, the production cost is also reduced.

BRIEF DESCRIPTION OF THE DRAWINGS

Other features and advantages of the invention will emerge from the description, which is made below, in reference to the drawings, wherein.

DETAILED DESCRIPTION OF THE DRAWINGS

Figure 1:
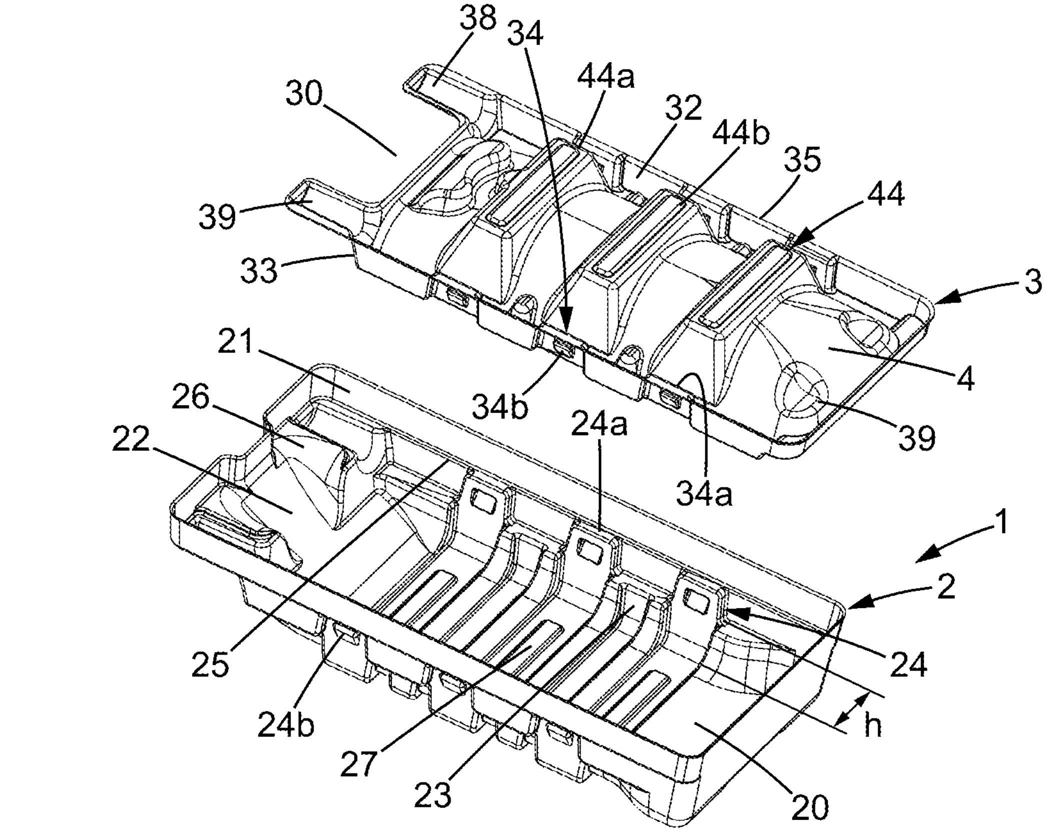
FIG. 1 schematically represents, as an exploded view, a bagless protective container example according to an embodiment of the invention, FIG. 2 schematically represents, as an assembled view, a protective container example integrating a bag according to an embodiment of the invention, FIG. 3 schematically represents, as a top view, a protective container example integrating a bag according to an embodiment of the invention, FIGS. 4*a* and 4*b* schematically represent a detailed, transversal cross-sectional and perspective view of an example of an abutment of the lower shell in contact with the upper shell, FIGS. 5*a* to 5*c* schematically represent, as a top view, four successive steps of an example of a method for assembling a protective assembly of a bag according to an embodiment of the invention, FIG. 6 schematically represents, as an exploded view, a bagless protective container example according to a second embodiment of the invention, FIG. 7 schematically represents, as a top view, a protective container example integrating a bag according to a second embodiment of the invention, FIG. 8 schematically represents, as a bottom view, a protective container example integrating a bag according to a second embodiment of the invention, FIG. 9 schematically represents a side view of a lower shell of a protective container according to a third embodiment of the invention, FIG. 10*a* schematically represents a bottom view of an upper shell of a protective container according to a third embodiment of the invention, FIG. 10*b* schematically represents a top view of a protective container according to a third embodiment of the invention, FIG. 11 schematically represents an exploded view of a bagless protective container example according to a fourth embodiment of the invention, FIG. 12 schematically represents a top view of a protective container according to a fourth embodiment of the invention, FIG. 13 schematically represents a transversal cross-section of the rear of a protective container according to a fourth embodiment of the invention, FIG. 14 schematically represents a detailed, perspective view of a plurality of lower shells interlocked on one another, FIG. 14*a* schematically represents a detailed, cross-sectional view of a plurality of upper shells interlocked on one another, FIG. 15 schematically represents a detailed, perspective view of a plurality of upper shells interlocked in one another, FIG. 15*a* schematically represents a detailed, cross-sectional view of a plurality of lower shells interlocked on one another, FIG. 16 schematically represents, as a perspective, a stack example on one another of several protective containers integrating bags according to an embodiment of the invention.

FIG. 1 schematically represents an exploded view of a bagless protective container according to a first embodiment of the invention.

Below in the description, the term "front" is used to designate the part of the protective container located at the level of the outlet of the tubes of the bag, the term "rear" is used to designate the part of the container opposite the outlet of the tubes of the bag. Thus, the protective container 1 has a longitudinal extension direction between the rear end thereof and the front end thereof.

The protective container 1 comprises a lower shell 2, and an upper shell 3 comprising a recess 4. The biopharmaceutical liquid bag, not represented in FIG. 1, is placed in the bottom 20 of the lower shell 2, covered by the upper shell 3 so as to be covered by the recess 4, the upper shell 3 being inserted in the lower shell 2. The upper shell 3 can be inserted in the lower shell 2 without exceeding the top of it, or almost without exceeding it.

The lower shell 2 comprises a bottom 20 and four side walls 21, among which the side walls 21 of the side, or the longest side walls, as well as the front and rear side walls 21. A side wall 21 of the lower shell 2 has at least one inclined portion 22 at least at the level of the bottom 20 of the lower shell 2, through which, in particular, the tubes of the bag can exit.

For example, the inclined portion 22 is located at the level of a longitudinal end located at the level of the outlet of the tubes. More specifically, the front side wall 21 comprises such an inclined portion 22.

The side walls 21 of the side have cavities 23 on which the upper shell 3 will be able to be placed. The cavities 23 have a height h, such that the upper shell 3 is retained in the top part of the side walls 21 of the lower wall 2 when the upper shell 3 rests on the cavities 23 of the lower shell 2.

The inner surfaces of the side walls 21 of the side also have fixing elements 24 preventing a vertical translation of the shells 2, 3 against one another. The fixing elements 24 comprise a displacement 24*a* comprising a fixing member 24*b*. The fixing members are, for example, clips.

The inner surfaces of the side walls 21 of the side also comprise horizontal shoulders 25 on which an edge 35 of the upper shell can bear when the shells 2, 3 are assembled.

The lower shell 2 further comprises at least one abutment 26 at the level of a longitudinal end located at the level of the outlet of a bag tube, i.e. at the level of the front side wall 21 of the lower shell 2. The upper shell 3 is capable of coming into contact with the abutment 26.

The upper shell 3 comprises a recess 4. The r recess 4 has a concave shape, facing the bottom 20 of the lower shell 2.

The upper shell 3 also has an annular side wall 32 typically constituted of several side wall elements, here four side wall elements, with, in particular, two longitudinal wall elements 32*a*, 32*b* of the side wall 32, which are, for example, the two longest elements of the side wall 32, and a rear side wall element 32*c*.

The annular side wall 32 can have a frame format, for example, rectangular or square, possibly with rounded edges in the angles. This is the same for the side wall 21 of the lower shell 2. Typically, each side wall 21, 32 annularly extends about a central axis capable of defining the dimension at the top of the protective container 1.

Two upper longitudinal edges B2 are typically provided in the lower shell 2 and two upper longitudinal edges B3 (at the level of the edge 35) in the upper shell 3, which can be seen in FIG. 1. The longitudinal edges of each pair can be parallel, and preferably rectilinear. The upper edges B2 in the lower shell 2 can, in the assembled state of the shells 2, 3, be located above the upper edges B3 of the upper shell 3 with a difference of level of around 1 cm for example, or more.

Figure 6:
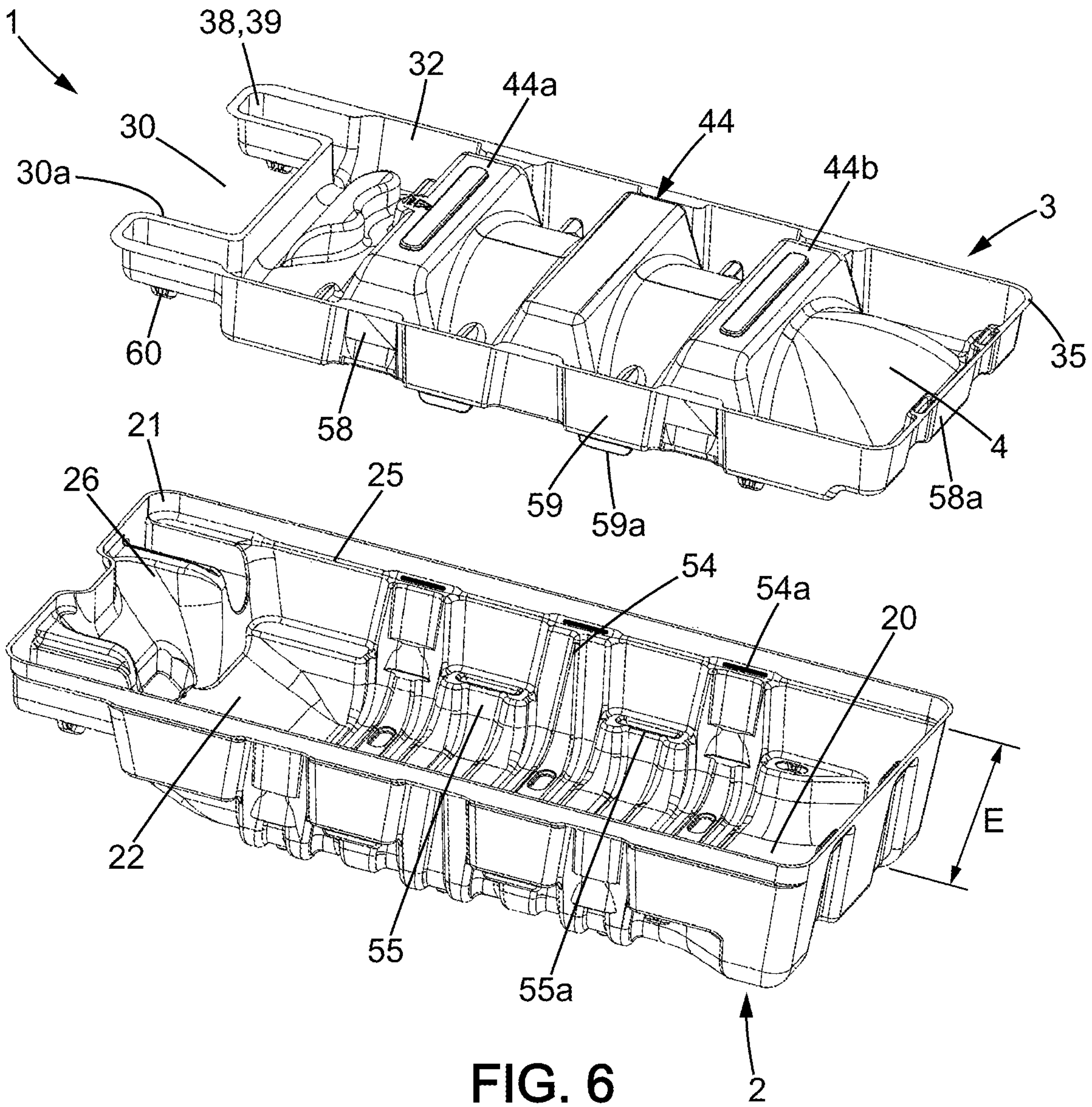
Figure 10A:
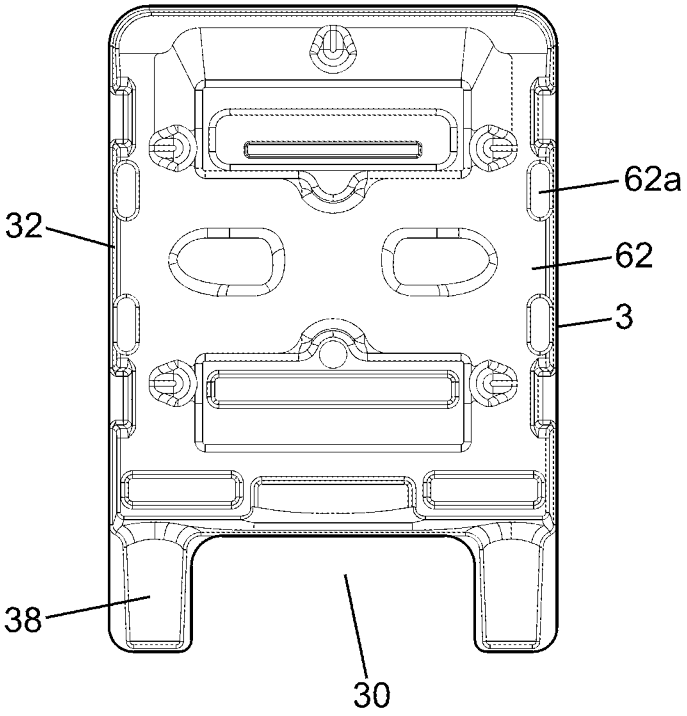

Typically, as can be seen in FIG. 6 for example, the side wall 32 of the upper shell 3 includes or forms insertion and guiding parts being housed (at least partially) in the inner volume V2 of the lower shell 2, along the side wall 21. Preferably, the insertion and guiding parts comprise two longitudinal wall elements 321, 322, parallel to one another, which extend from a longitudinal end to the other longitudinal end of the upper shell 3, and each extending between the corresponding longitudinal upper edge B3 of the upper shell 3 and a respective lower face F31, F32 of the upper shell 3 (lower face F31, F32 which can be substantially flat, except for a few lugs 62*a* or local projections which protrude towards the bottom from the plane of this lower face, as can be seen in FIG. 10*a*).

The insertion and guiding parts can form the side wall 32, by being presented in the form of an insertion frame optionally provided with lugs 62*a* or similar projections protruding towards the bottom of the lower shell 2.

The upper shell 3 is, for example, shorter than the lower shell 2 on at least some of the width thereof, so as to define an opening 30, making the inside of the container 1 accessible from the outside. The opening 30 is, for example, located at the front end (longitudinal end opposite the rear wall element 32*c*) of the upper shell 3.

The opening remains surrounded by at least one, even two, front end portions 38 of the upper shell 3.

The opening 30 is, in particular, located at least partially facing the inclined portion 22 of the lower shell 2, making it possible to create a passage 31 by which the tubes of the bag can exit from the recess 4 to open outside of the protective container.

The opening 30 comprises outer perimeters 30*a* intended to bear against the abutments 26 of the lower shell 2.

The side walls 32 of the side of the upper shell also comprise peripheral abutments 33, capable of bearing on the cavities 23 of the lower shell 2.

The side walls 32 of the upper shell 3 also comprise complementary fixing elements 34 of the fixing elements 24 of the lower shell 2. The fixing elements 34 likewise comprise a displacement 34*a* capable of coming into contact with the displacement 24*a* of the complementary fixing elements 24 of the lower shell 2, as well as a fixing member 34*b* engaging with the complementary fixing member 24*b*.

The peripheral abutments 33 of the side walls engaging with protrusions 36 of the side walls 41 of the side of the recess 4 to form chicanes 45 wherein the bag tubes can pass and be retained in place. Between the recess 4 and the side walls 32 of the upper shell 3, an annular space 37 is located, wherein one or more bag tubes will be able to be arranged. This annular space 37 is therefore a storage space for all or some of the tubes of the bag.

The recess 4, intended to cover the bag 50, has a bottom 40, here in the ceiling position, side walls 41 of the side, a front side wall 43 from where the passage 31 starts, a rear side wall 42 forming the rear of the recess 4 against which the rear of the bag comes.

The bottom or bottom part 40 of the upper shell 3 has a periphery connected to the insertion and guiding parts. This bottom makes it possible to form the recess 4, which extends here at a distance from the insertion and guiding parts in contact with the side wall 21.

Figure 2:
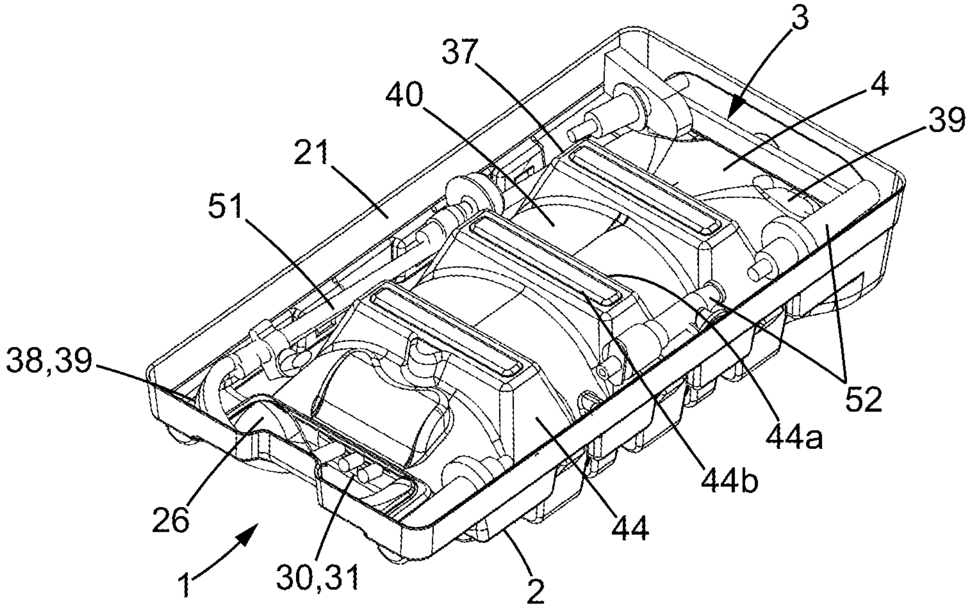

FIG. 2 schematically represents an assembled, perspective view of a protective container example 1 integrating a bag 50 according to an embodiment of the invention.

The upper shell 3 has been fully inserted in the lower shell 2. The side walls 32 of the upper shell 3 have slid along the side walls 21 of the lower shell 2, and are practically located against them, once the upper shell 3 resting on the cavities 23 of the lower shell 2.

In the assembled state of the shells 2, 3, it can be seen in FIGS. 2 and 6 that the recess 4 has a height profile such that the height of the recess 4 increases as the two longitudinal wall elements 321, 322 of the upper shell 3 approach one another, and that a central zone of the bottom 40 approaches. The height of the bag housing of the container is thus increased by this profile, selectively in a longitudinal median zone equidistant from the edges B2 and from the two longitudinal wall elements 321, 322. The height difference in the profile of the recess 4, can correspond to the height difference between the upper edge B2 and the upper edge B3 placed here fully in the inner volume V2 of the lower shell.

The bag 50 which cannot be seen in FIG. 2 is covered by the recess 4 and is located between the upper shell 3 and the lower shell 2. The tubes 51 of the bag exit through the passage 31, pass above the abutments 26 of the lower shell 2 and the portions 38 surrounding the opening 30 of the upper shell 3, before going around the recess 4 in the annular space 37 by passing between the chicanes 45 and the protrusions 36. A connector 52 at the tube end 51 is therefore fixed in the cavities 39 of the upper shell 3. The cavities 39 are, for example, arranged on either side of the opening 30 of the upper shell 3. More specifically, the portions 38 of the upper shell surrounding the opening comprise such cavities 39, so as to form a duct. More cavities 39 can be arranged at the level of a rear end of the upper shell 3. For example, the bottom 40 of the recess 4 comprises such cavities 39, for example two.

Figure 3:
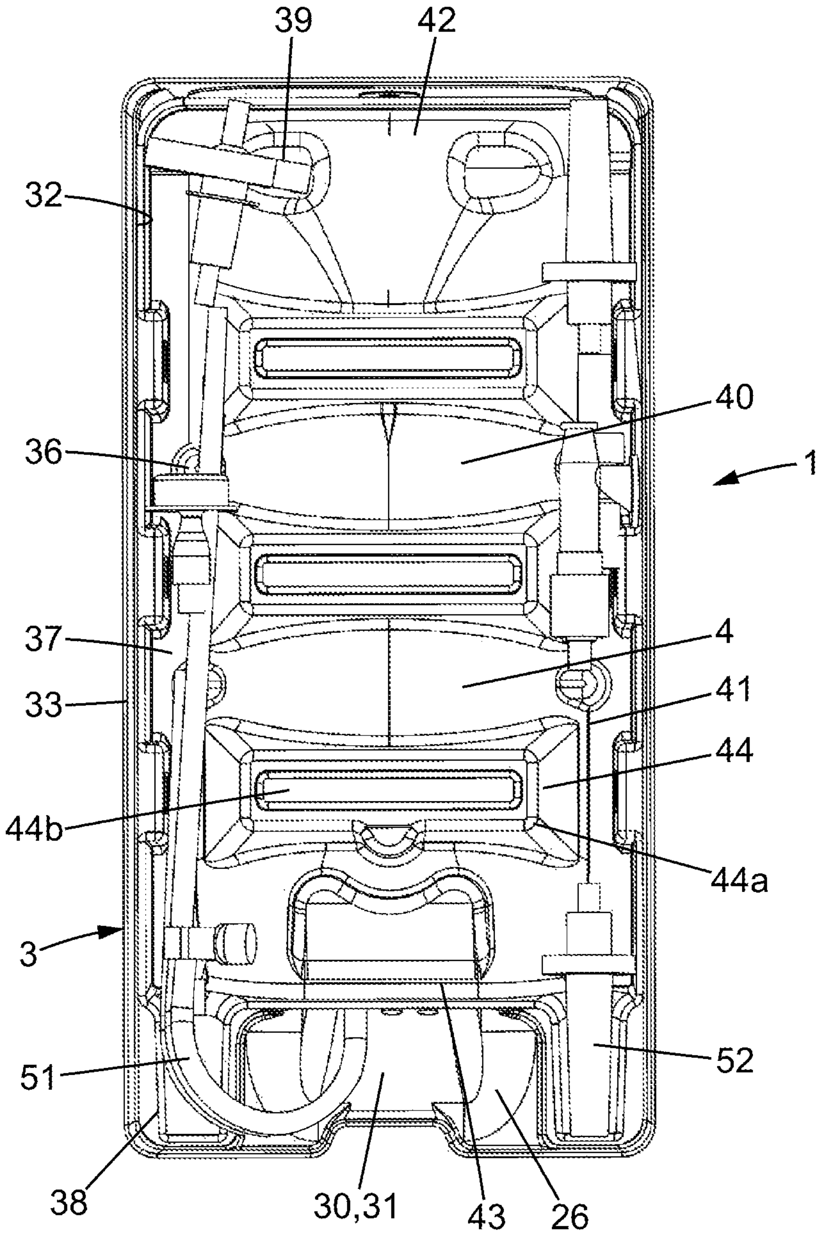

FIG. 3 schematically represents an assembled, top view of a protective container example integrating a bag according to an embodiment of the invention.

The upper shell 3 is inserted in the lower shell 2, the side walls 32 of the upper shell 3 being practically against the side walls 21 of the lower shell 2. The tube 51, attached to the bag 50 covered by the recess 4, exits through the passage 31, passes above the abutment 26 and the portion 38 surrounding the opening, at least partially goes around the recess 4 in the annular space 37 located between the walls 41 to 43 of the housing or recess 4 and the side walls 32 of the upper shell 3, by passing through the chicanes 45 and the protrusions 36, to be blocked by the connector 52 thereof in one of the cavities 39 provided for this purpose.

Figure 4A:
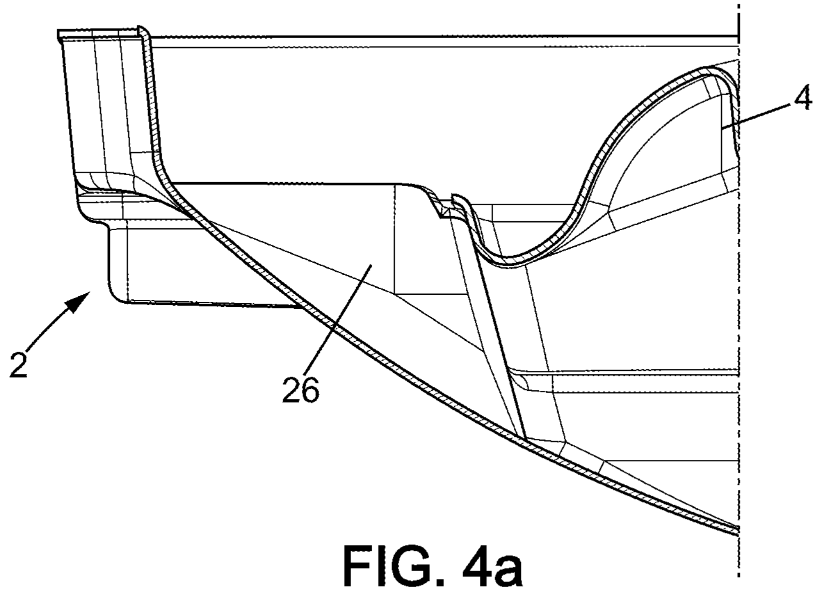
Figure 4B:
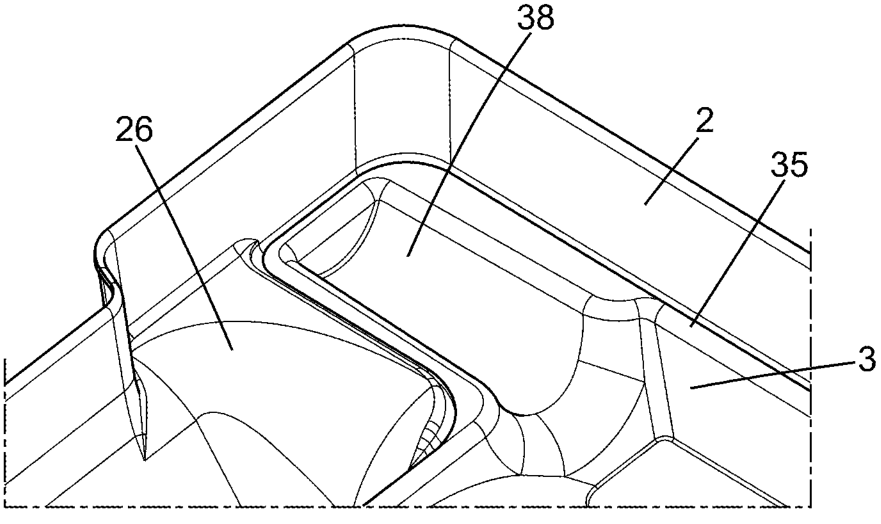

FIGS. 4*a* and 4*b* illustrate more specifically the passage 31, the abutment 26 of the lower shell 2 and one of the portions 38 surrounding the opening 30 of the upper shell 3.

The portion 38 of the upper shell 3 rests between the side edge 32 and the abutment 26, such that the outer perimeters of the opening 30 are directly in contact with the abutment 26. The abutment 26 has rounded edges, in order to avoid weakening the tubes 51 of the bag 50 when they are wound around the recess 4 in the annular space 37.

The abutment 26 also makes it possible to retain the bag 50 in the space delimited by the recess 4 and the bottom 20 of the lower shell 2, in fact making it possible for the front of the bag 50 to bear against the abutment 26. The inclined portion 22 of the lower shell 2 also plays this role of retaining the bag 50, since the front part of the bag 50 directly bears against the inclined portion 22.

Figure 5A:
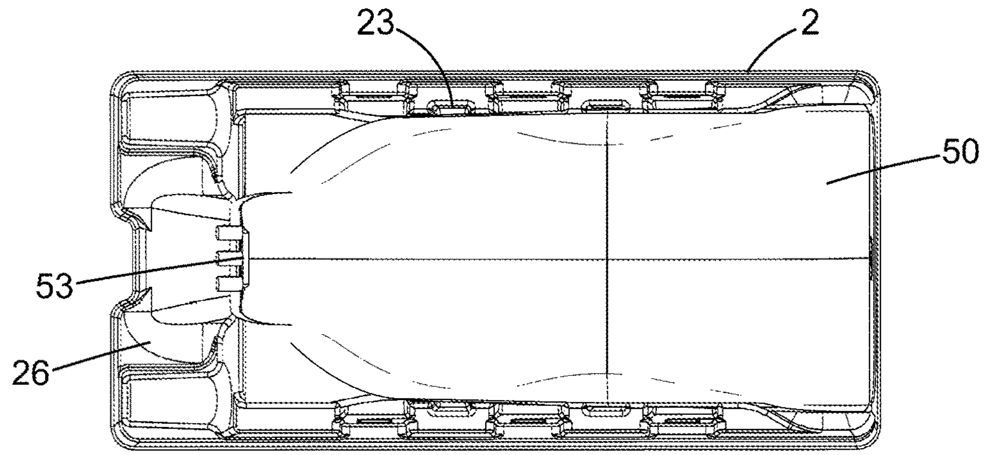
Figure 5B:
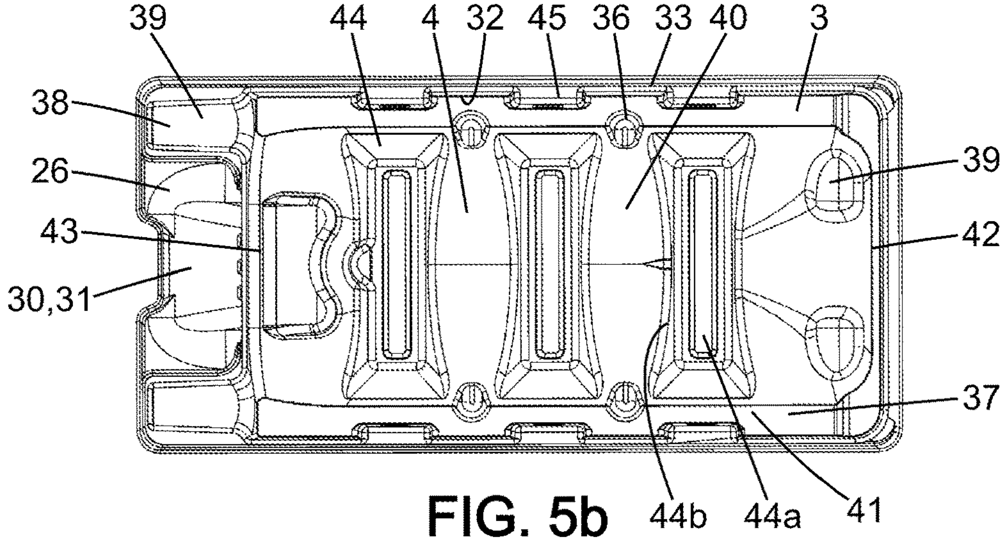
Figure 5C:
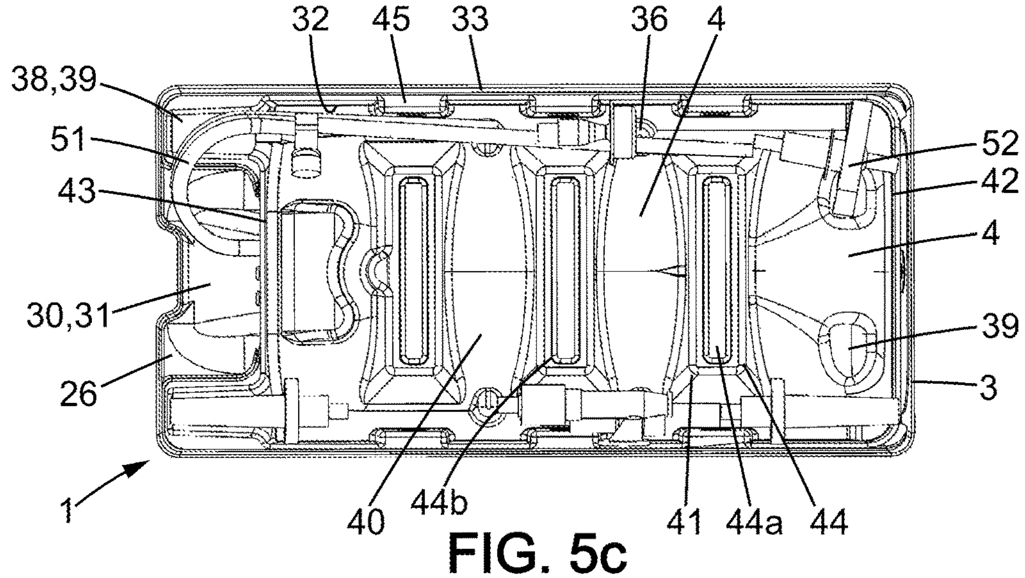

FIGS. 5*a* to 5*c* schematically represent, as a top view, four successive steps of an example of a method for assembling a protective assembly of a bag according to an embodiment of the invention.

In FIG. 5*a*, the bag 50 is arranged in the bottom 20 of the lower shell 2. From an upper bag 50 opening 53, tubes 51 ended by connectors 52 start, these tubes 51 exiting at the level of the inclined portion 22 of the lower shell 2. The rear of the bag 50 is on the side of the rear side wall 21 of the lower shell 2.

In FIG. 5*b*, the upper shell 3 covers the bag 50 which can therefore no longer be seen. Only the tubes 51 exiting from the upper shell 3 through the passage 31 can still be seen. The annular space 37 goes around the recess 4. This annular space, equipped with chicanes 45 is empty, as it does not still contain the tubes 51. The rear part of the bag 50 is in fact folded and crimped between the bottom 20 of the lower shell 2 and the rear side wall 32 of the upper bag 3, thus ensuring the retention of the bag 50 at the level of the rear part thereof.

In FIG. 5*c*, the tubes 51, exit from the passage 31 through the opening 30, go around the housing 4 inside the side walls 32 of the upper shell 3 passing through the chicanes 45 and the protrusions 36, before the connector 52 of one of these tubes 51 is blocked in one of the cavities 39 provided for this purpose. Several other tubes 51 or connectors 52 can also be wedged in the annular space 38 or in the cavities 39. The protective container 1 is thus completely closed.

The bag 50 can be filled with biopharmaceutical product after closing the protective container 1. In a variant, the bag

50 can be filled before being placed in the bottom 20 of the lower shell 2, or before placing the upper shell 3.

It must be noted that the inclined portion 22 of the lower shell 2 furthermore ensures the retention of the biopharmaceutical product in the protective container 1 in case of releasing the biopharmaceutical product in said container 1, for example if the bag 50 is pierced. The retention volume can be at least equal to 5 liters, even 10 liters, even 20 liters, even 50 liters.

The lower shell 2 is sized such that it is capable of retaining a volume equivalent to 20% of the retention volume in addition to the retention volume.

Below in the description, the elements which are identical in all the embodiments and having already been described are not described and the same numerical references are used.

Figure 7:
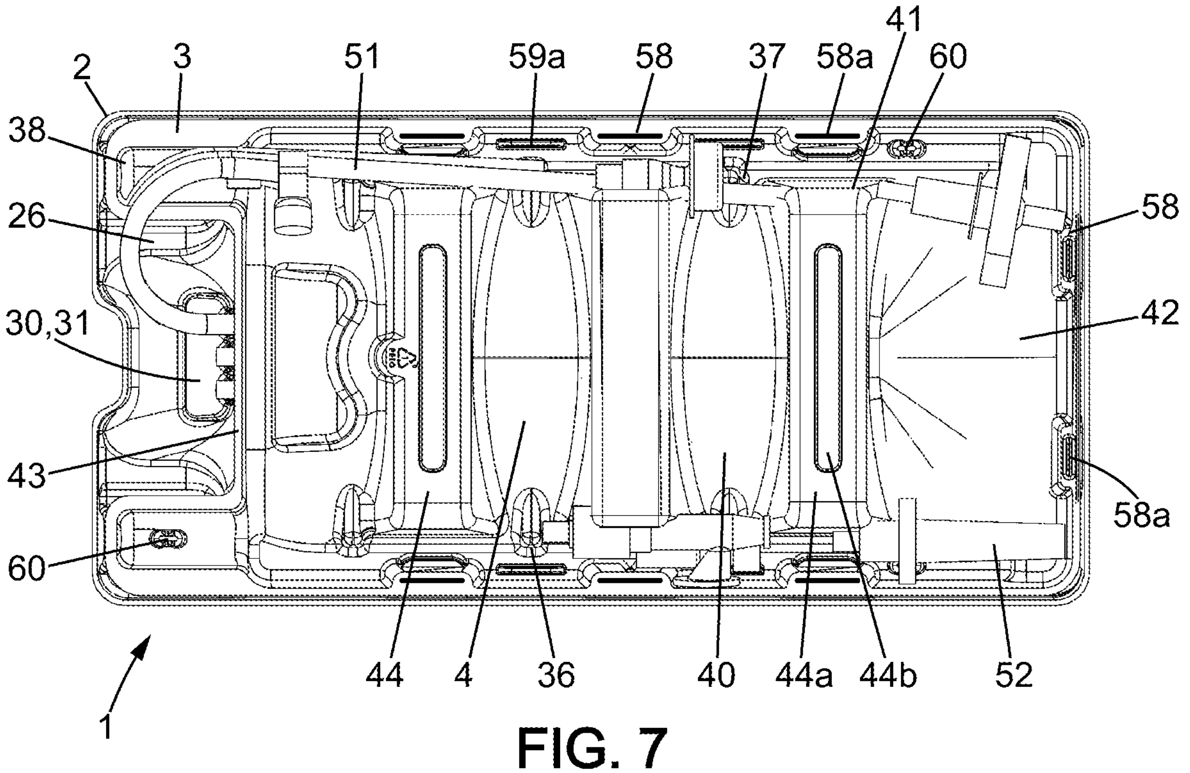
Figure 8:
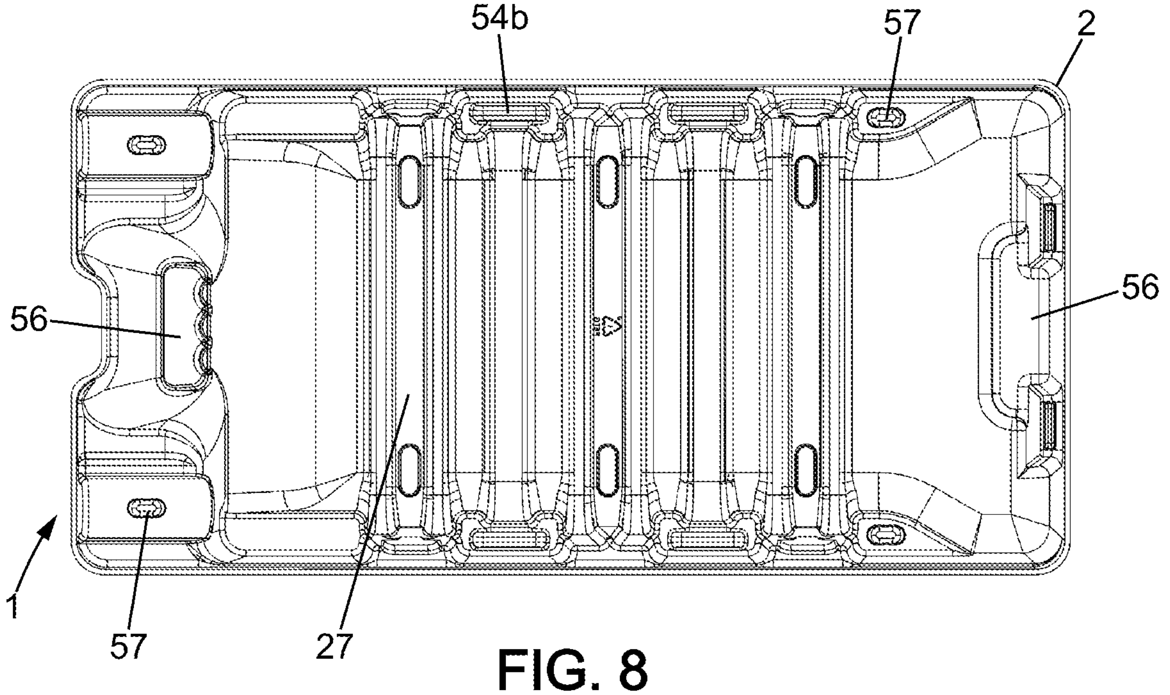

In reference to FIGS. 6 to 8, a protective container 1 example is described according to a second embodiment of the invention.

The side walls 21 of the lower shell 2 have cavities 54 on which the upper shell 3 can be placed. The cavities 54 have a height E, such that the upper shell 3 is retained in the top part of the side walls 21 of the lower shell 2 when the upper shell 3 rests on the cavities 54 of the lower shell 2.

The height E of the cavities 54 is greater than the height h of the cavities 23 described in relation to the first embodiment. The height E of the cavities 54 makes it possible, on the one hand, to rigidify the structure of the lower shell 2. The height E of the cavities however remains less than the height of the side walls 21. For example, there still remains a distance at least equal to 1 centimeter between the upper end of the cavities 54 and the upper end of the side walls 21.

This distance is, in particular, selected in order to make it possible for an optimum stack of several containers on one another. Indeed, to make it possible for an optimum stack of several protective container 1, the arches 44 of the upper shell 3 must not or must barely exceed the top of the upper ends of the side walls 21 of the lower shell. For example, the protrusions 44*b* exceed the protective container 1 to make it possible for the interlocking of several protective containers 1.

The cavities 54 can be located on at least three of the four side walls 21 of the lower shell 2. For example, the cavities 54 are located on the side walls 21 of the side and rear, such as can be seen in FIG. 7.

The cavities 54 can further comprise a positioning orifice 54*a* in the upper end thereof. This positioning orifice 54*a* is capable of receiving a complementary pin 54*b*, provided on the outer surface of the lower shell 2. This makes it possible to improve the positioning and the retention of the lower shells together when they are stacked on one another.

An edge 35 of the upper shell can bear on the upper ends of the cavities 54 when the shells 2, 3 are assembled.

The inner surfaces of the side walls 21 also have fixing elements 55 preventing a horizontal translation of the shells 2, 3 against one another. The fixing elements 55 comprise a receptacle 55*a*, capable of receiving a complementary fixing element of the upper shell 3.

Receptacles 57 are also provided on either side of the abutments 26, and at the rear ends of the side walls 21 of the side, as can be seen in FIG. 8. The receptacles 57 engage with lugs 60 provided on the upper shell. The receptacles 57 and the lugs 60 engage such that they prevent the vertical translation of the lower 2 and upper 3 shells. The receptacles 57 and the lugs 60 comprise, for example, clips.

Figure 11:
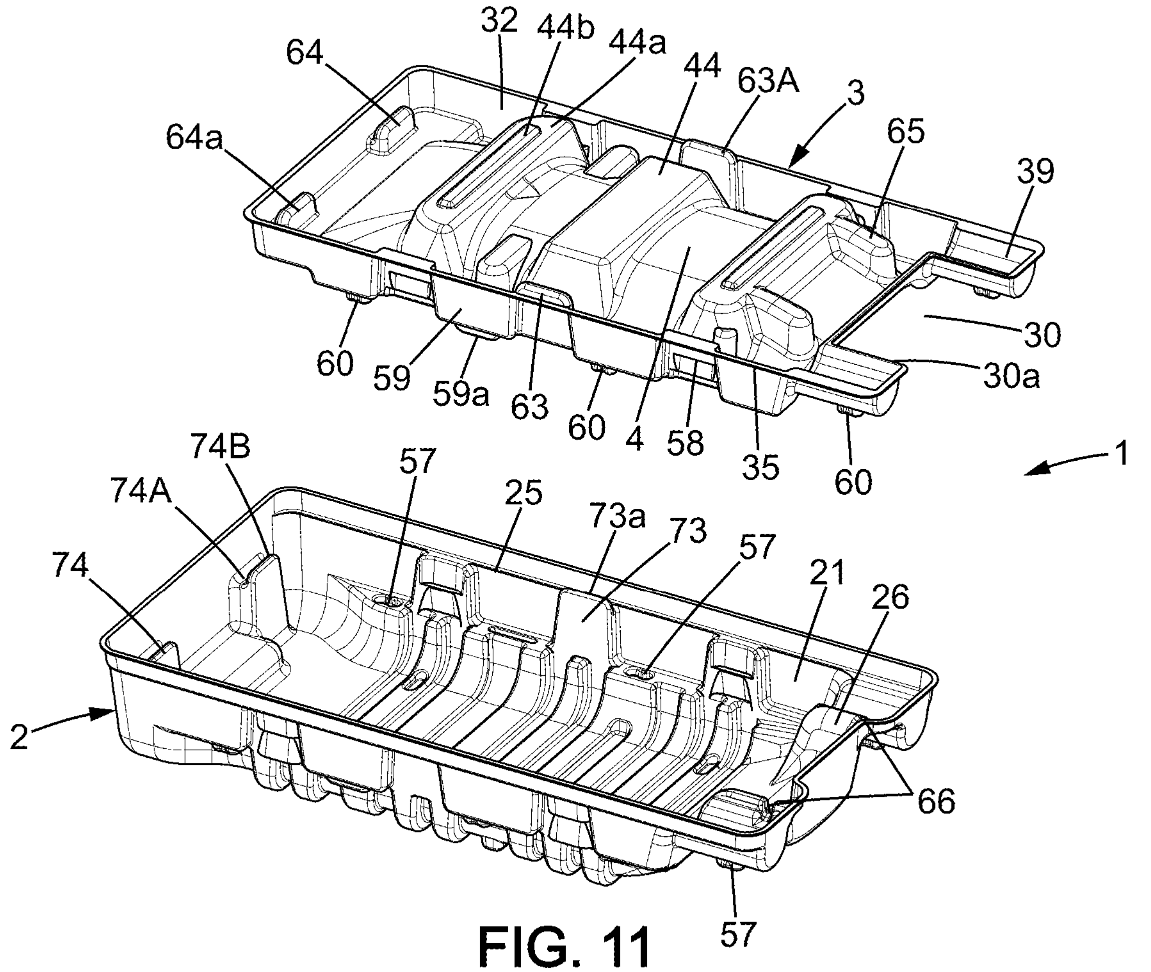
Figure 12:
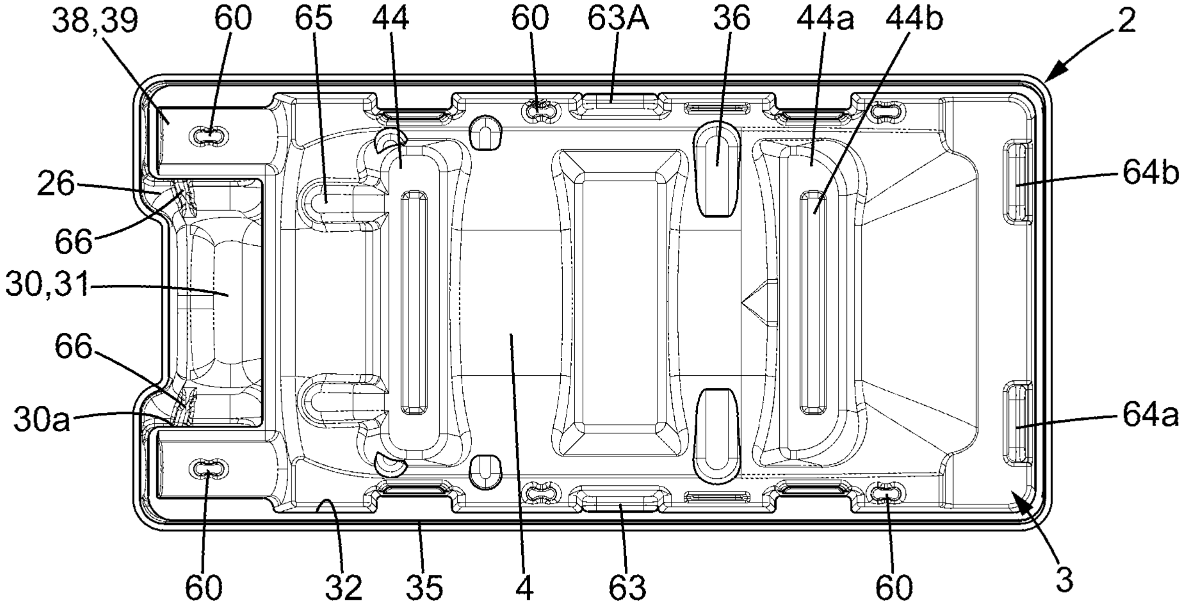

Alternatively, a greater number of receptacles 57 and lugs 60 can be provided. For example, receptacles 57 and lugs 60 can be provided respectively along the side walls 21 of the side of the lower shell 2 and along the side walls 32 of the side of the upper shell 3, in addition to the receptacles 57 provided on either side of the abutments 26, and at the rear ends of the side walls 21 of the side. This embodiment alternative is illustrated in FIGS. 11 and 12.

According to an embodiment, the clips can be irreversible. More specifically, the lugs 60 and the receptacles 57 prevent the lower and upper shells of being disconnected from one another.

According to another embodiment, the clips can be reversible. More specifically, the lower and upper shells can be disconnected from one another after assembly.

The lower shell 2 also comprises at least one gripping zone 56 preferably located at the level of the inclined portion 22. The gripping zone 56 advantageously includes several cavities spaced from one another, as illustrated in FIG. 8. Another gripping zone 56 can also be located at the level of the outer surface of the bottom 20, in particular, behind the lower shell 2. The gripping zone 56 can also comprise cavities spaced from one another. The gripping zones making it possible for an operator to be able to easily hold and handle a protective container 1.

The side walls 32 of the upper shell 3 comprise peripheral abutments 58, capable of bearing on the cavities 54 of the lower shell 2.

The rear side wall 32 of the upper shell 3 can also comprise peripheral abutments 58, engaging with the cavities 54 located on the rear side wall 21 of the lower shell 2.

The peripheral abutments 58 can comprise positioning orifices 58*a* in the upper end thereof. These positioning orifices 58*a* are capable of receiving complementary pins (not represented), provided on the upper shell 3. This makes it possible to improve the positioning and the retention of the upper shells together when they are stacked on one another.

The side walls 32 of the upper shell 3 also comprise complementary fixing elements 59 of the fixing elements 55 of the lower shell 2. The fixing elements 59 comprise lugs 59*a* capable of being inserted in the receptacles 55*a* of the fixing elements 55 of the lower shell 2.

Lugs 60 are also provided on the two front end portions 38 of the upper shell 3, as well as at the level of the rear ends of the side walls 32 of the side. The lugs 60 are capable of being inserted in the receptacles 57 of the lower shell 2 so as to prevent a vertical translation of the shells 2 and 3 against one another.

The side walls 32 of the upper shell 3 have a greater height than the side walls 32 of the first embodiment. Thus, the edge 35 of the side walls 32 of the upper shell 3 can bear on the cavities 54 of the lower shell 2, such that the protrusions 44*b* of the arches 44 exceed the protective container 1.

Figure 9:
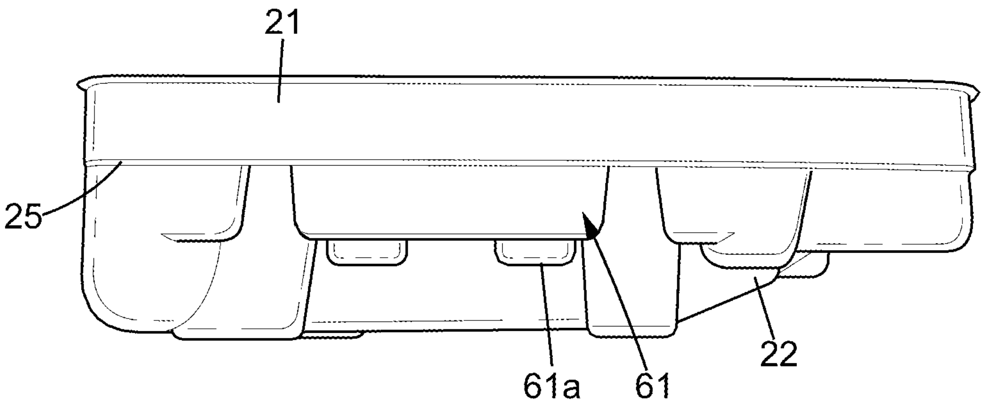

FIG. 9 is a side view of a lower shell 2 of a protective container according to a third embodiment of the invention.

The lower shell 2 is particularly intended to contain a bag of a smaller volume, typically 5 liters.

The side walls 21 of the lower shell 2 comprise fixing elements 61 engaging with fixing elements 62 provided on the upper shell 3. The fixing elements 61 are, for example, provided on the side walls 21 of the side of the lower shell.

The fixing elements 61 make it possible to ensure the retention of the upper and lower shells when they are assembled and prevent the horizontal translation of the lower and upper shells against one another.

The fixing elements 61 comprise a receptacle 61*a*, capable of receiving a complementary lug of the upper shell 3. The receptacles 61*a* engage with lugs 62*a* provided on the upper shell. The receptacles 61*a* and the lugs 62*a* engage such that they prevent the vertical translation of the lower 2 and upper 3 shells. The receptacles 61*a* and the lugs 62*a* comprise, for example, clips.

The upper shell 3 is represented as a bottom view in FIG. 10*a*.

The side walls 32 of the upper shell 3 comprise fixing elements 62 engaging with the fixing elements 61 provided on the lower shell 2. The fixing elements 62 are, for example, provided on the side walls 32 of the side of the upper shell.

The fixing elements 62 of the upper shell 3 comprise, in particular, lugs 62*a* engaging with the receptacles 61*a* of the lower shell 2.

Figure 10B:
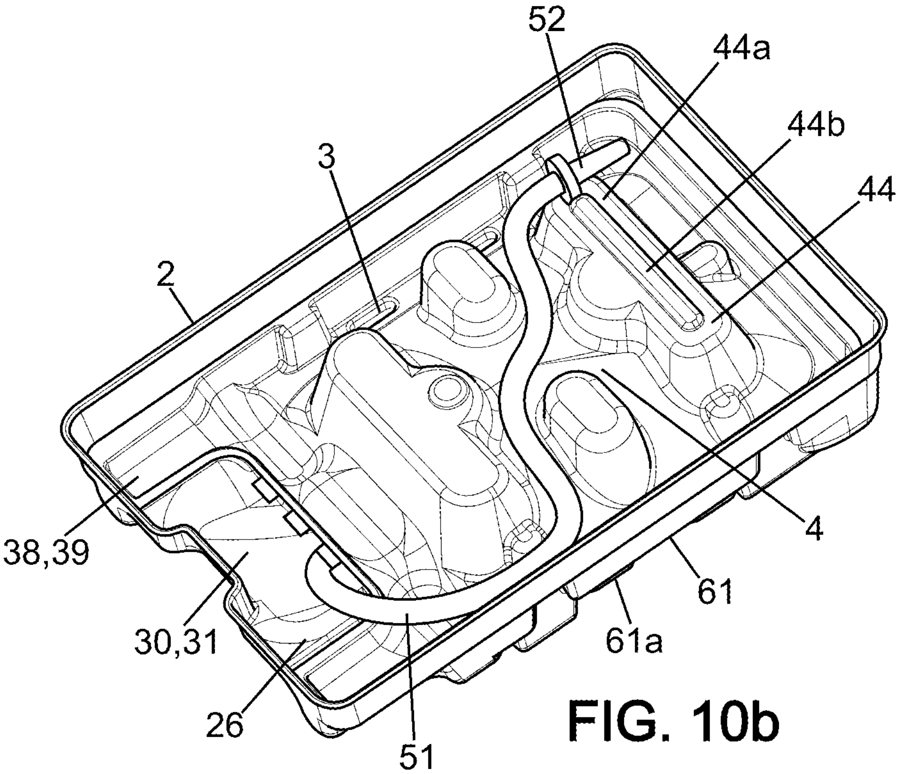

A protective container is represented as a top view in FIG. 10*b*

In this figure, the X-shape of the recess 4 of the upper shell 3 can be seen. This embodiment makes it possible to place the connectors 52 and the tubes 51 of the bag, which are more difficult to arrange in the case of protective containers of a reduced size.

Figure 13:
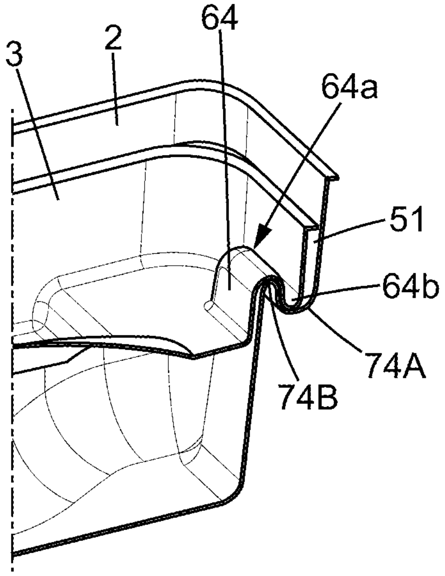

In reference to FIGS. 11 to 13, a protective container 1 example is described, according to a fourth embodiment of the invention.

The protective container 1 according to this fourth embodiment is, for example, particularly intended to contain a bag of a volume of less than 50 liters.

In this embodiment example, the side walls 21 of the lower shell 2 have cavities 73, and the cavities 54 described in reference to the preceding embodiments. For example, the side walls 21 of the side can comprise at least one cavity 73, for example located at the level of the middle of the length of the side walls 21 of the side.

The cavities 73 comprise an excrescence 73*a*. The height of the excrescences 73*a* is greater than the height of the cavities 54, such that the upper end of the excrescences 73*a* extends beyond the horizontal shoulder 25. The height of the excrescences 73*a* is less than the height of the side walls 21 of the lower shell 2.

The cavities 73 engage with peripheral abutments 63 of the side walls 32 of the upper shell 3. The peripheral abutments 63 comprise a complementary excrescence 63A of the excrescence 73*a* of the cavities 73 of the lower shell. The engagement of the excrescences 63A, 73*a* of the cavities 63, 73 makes it possible to avoid a horizontal translation of the upper and lower shells 3, 2, against one another. Thus, it is noted that the excrescences 63*a* and 73*a* form complementary fixing elements preventing a translation of the shells 2, 3 against one another.

The side walls 21 of the lower shell 2 can also comprise rigidifying elements 74 engaging with rigidifying elements 64 comprised on the side walls 32 of the upper shell 3. The rigidifying elements 64 form peripheral abutments. The rigidifying elements 74 form cavities, forming support elements.

The rigidifying elements 64, 74 are, for example, located on the rear side walls 21, 32 of the shells 2, 3. For example, at least one rigidifying element 64, 74 is provided at the level of the rear side wall of the shells 2, 3, and preferably at least two rigidifying elements 64, 74 are provided.

The rigidifying elements 74 of the lower shell 2 comprise a height less than the height of the horizontal shoulder 25, such that the rigidifying elements 64 of the upper shell 3 have a height less than the height of the edge 35 of the side walls 32. In this embodiment, the rear side wall 21 of the lower shell does not comprise any horizontal shoulder 25.

The rigidifying elements 74 of the lower shell 2 comprise a support portion 74*a* on which a support portion 64*a* of the rigidifying element 64 of the upper shell 3 bears, as illustrated more specifically in FIG. 13.

The rigidifying elements 74 of the lower shell 2 further comprise an insertion portion 74*b* forming a protrusion from the support portion 74*a*, on which a complementary insertion portion 64*b* of the rigidifying elements 64 is capable of being inserted. The insertion portions 64*b*, 74*b* are of a complementary shape, such that after the insertion of the upper shell 3 in the lower shell 2, the insertion portions 64*b*, 74*b* prevent a horizontal translation of the two shells 2, 3 against one another. Thus, it is noted that the insertion portions 64*b*, 74*b* form complementary fixing elements preventing the translation of the shells against one another.

These rigidifying elements 64, 74 make it possible to rigidify the structure of the container 1 and make it possible to distribute the resistance forces when several containers 1 are stacked on one another.

On the other hand, the insertion portions 74*b* of the lower shell 2 also make it possible to improve the retention of the bag in the rear part of the protective container. A bag handle can advantageously be passed around the protruding insertion portion 74*b*, such that it is retained crimped between the two shells 2, 3. As FIG. 13 illustrates, when the upper shell 3 is inserted in the lower shell 2, a space 67 resides between the support portion 74*a* of the lower shell 2 and the edge 35 of the upper shell 3. An end of the bag can thus be contained in this space 67, without exceeding outside of the container 1.

The lower shell 2 also comprises a trough 66, provided on at least one of the abutments 26, or on the two abutments 26. The trough 66 extends, for example, from the inclined portion 22 of the lower shell to the contact point of the abutment 26 with the upper shell 3. When the upper shell 3 is inserted in the lower shell 2, an end of the trough 66 is in contact with the outer perimeters 30*a* of the opening 30 of the upper shell 3. The trough 66 is, for example, intended to receive a tube connector of "needleless" type, for example. This makes it possible to make it possible for an easy access to this tube connector.

As more specifically illustrated in FIGS. 11 and 12, the upper shell 3 can comprise at least one recess 65, located for example at the level of a front end of the recess 4. Advantageously, the upper shell 3 comprises at least two recesses 65. The recesses 65 are for example attached to the arch 44 adjacent to the opening 30. The recesses 65 extend, for example, transversally to the arch 44. In the case of stacking several containers 1 on one another, the weight of the containers 1 supported by the arches 44 is thus also distributed over the recesses 65. The recesses 65 also increase the rigidity of the protective container 1.

In a variant, the recesses 65 are not attached to the arches 44. Other recesses 65 can also be provided, in particular at the level of the rear end of the recess 4, or also between the arches 44.

Figure 14:
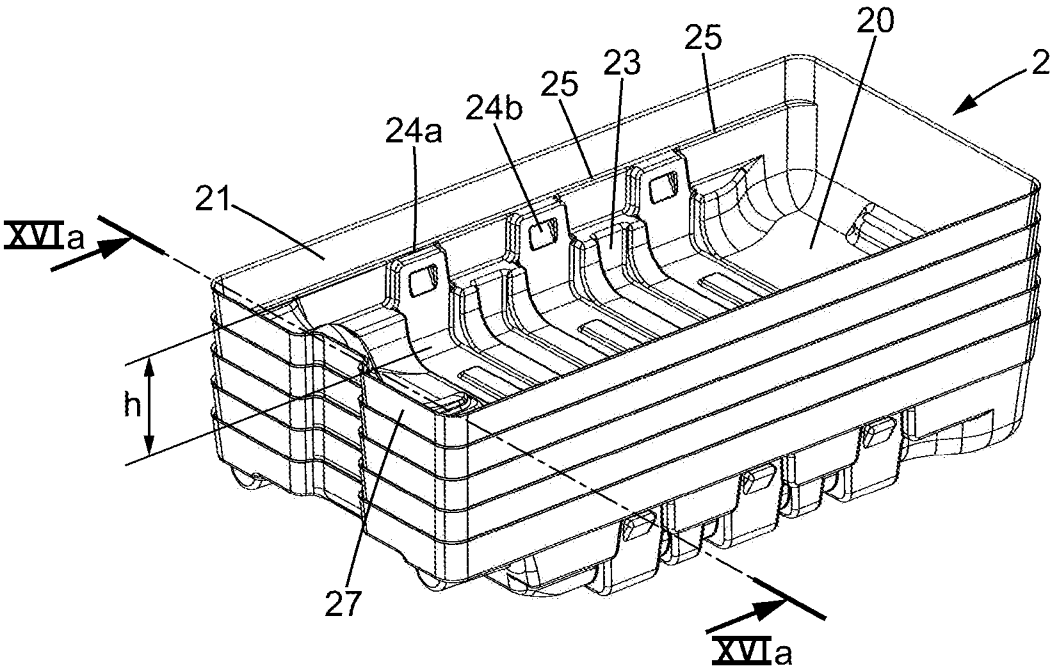
Figure 14A:
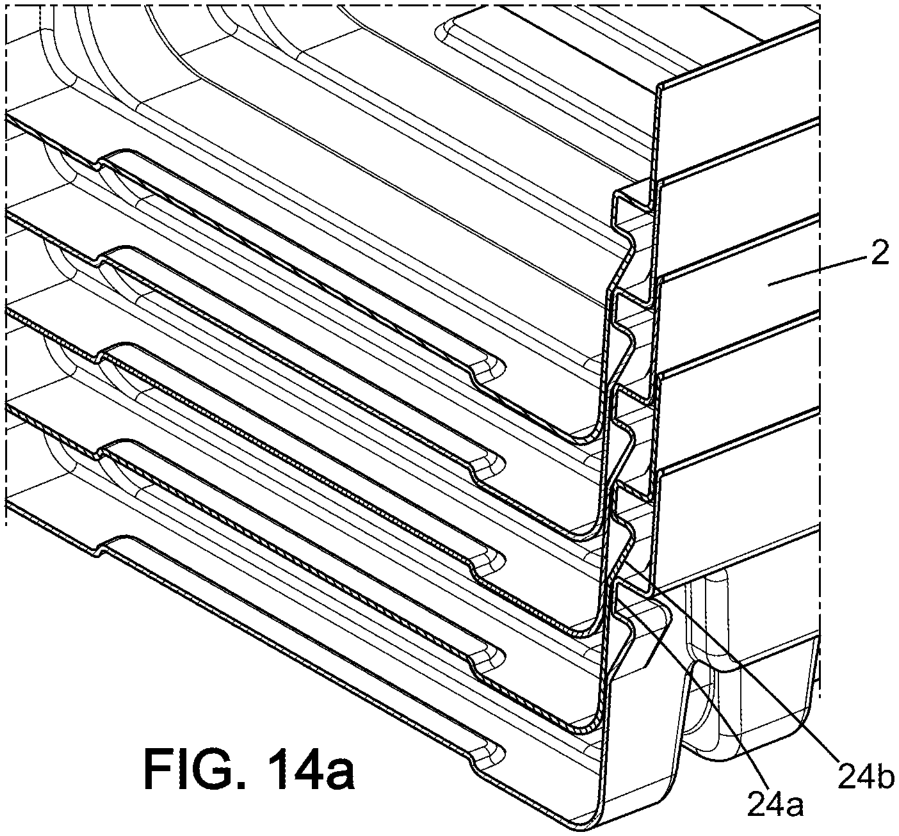

FIGS. 14 and 14*a* schematically represent, as a perspective, an example of a stack of several lower shells 2, according to the first embodiment, on one another.

Five lower shells 2 are stacked on one another. The lower shells 2 does not contain any bag. The fixing elements 24 of the side walls 21 of the side of the lower shells 2 above rest on the fixing elements 24 of the side walls 21 of the side of the lower shells 2 above. More specifically, the fixing members 24*b* of the fixing elements of the lower shells above rest on the cavities 24*a* of the fixing elements of the lower shells 2 below. According to this arrangement, the side walls 21 of the lower shells 2 above touch the side walls 21 of the lower shells below. This particular arrangement makes it possible to interlock several lower shells 2 without losing any space.

Figure 15:
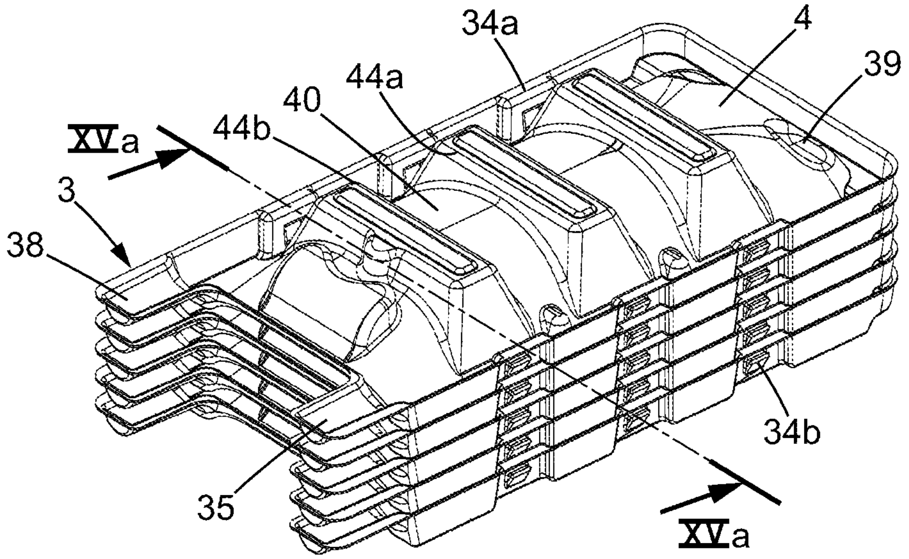
Figure 15A:
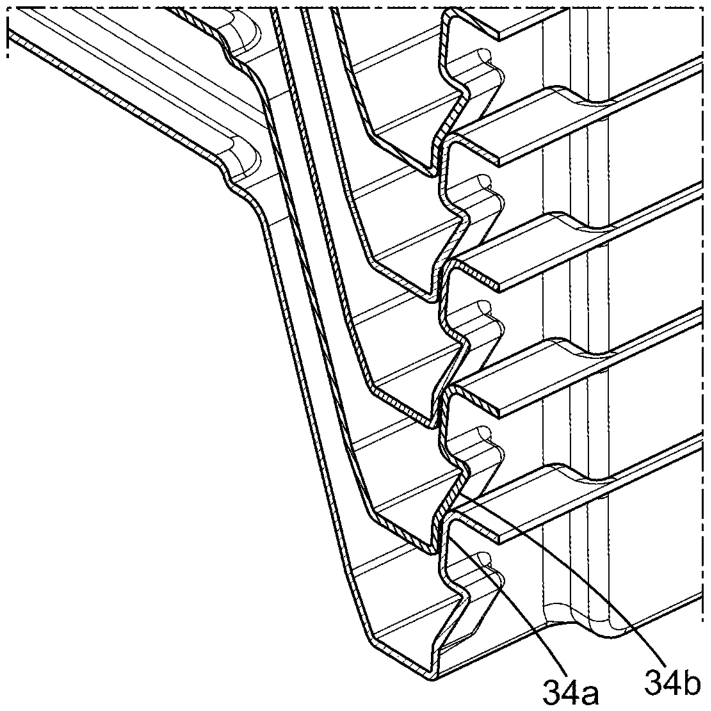

FIGS. 15 and 15*a* schematically represent, as a perspective, an example of a stack of several upper shells 3, according to the first embodiment, on one another.

Five upper shells 3 are stacked on one another. The fixing elements 34 of the side walls 32 of the side of the upper shells 3 above rest on the fixing elements 34 of the side walls 32 of the side of the upper shells 3 above. More specifically, the fixing members 34*b* of the fixing elements 34 of the upper shells above rest on the cavities 34*a* of the fixing elements 34 of the upper shells below. According to this arrangement, the side walls 32 of the upper shells 2 above touch the side walls 32 of the upper shells 3 below. This particular arrangement makes it possible to interlock several upper shells 3 without losing any space. It can also be seen that the distance between two consecutive lower faces F31 in the stack is less than the height of the wall element 321 and is more generally less than the height of the side wall 32.

Figure 16:
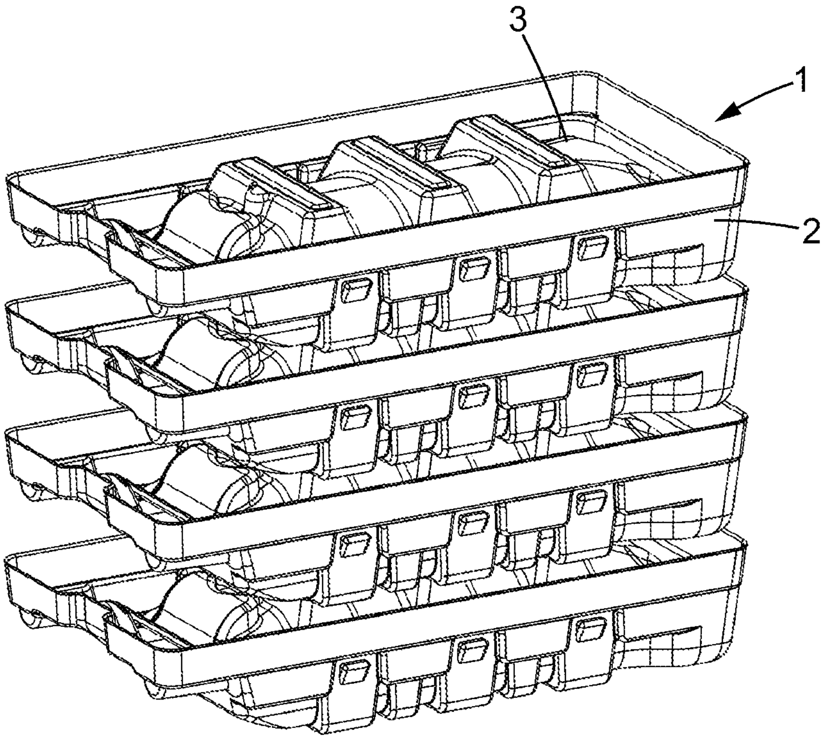

FIG. 16 schematically represents, as a perspective, an example of a stack on one another of several protective containers integrating bags according to the first embodiment of the invention.

The upper shell 3 further comprises at least one arch 44, preferably at least two or three arches 44. The arches 44 extend between two side walls 32 of the upper shell 3, for example between the two side walls 32 of the side. The arches 44 indeed bear on the recess 4. The arches 44 comprise an upper flat part 44*a*, capable of receiving the outer surface of the bottom 20 of the lower shell 2 of one at the protective container, as illustrated in FIG. 16. The upper flat part 44*a* of the arches 44 comprises a protrusion 44*b* suitable for being inserted in a complementary cavity 27 provided on the outer surface of the bottom 20 of the lower shell 2 still of another container.

These protrusions 44*b* engaging with the complementary cavities 27 make it possible to ensure the stability of the stack of protective containers 1 on one another.

The two longest side walls of the lower shell are inclined towards one another in the low parts thereof such that, when different protective containers are stacked on one another, a space is formed between two adjacent lower shells along these two adjacent lower shells so as to retain the tubes accessible to the hand of an operator.

In this manner, a controller easily has access to the bag tubes when several protective containers are stacked on one another. The space can be sufficiently wide to be able to pass a hand between two adjacent lower shells of two stacked protective containers.

The invention claimed is:

1. A protective container for a biopharmaceutical product bag comprising: a lower shell comprising a bottom and a lower shell side wall constituted of side wall elements, an upper shell comprising a recess capable of covering the bag, insertable in the lower shell, such that the upper shell is retained in the top part of the side walls of the lower shell by resting on support elements located in the lower shell (2), wherein the lower shell side wall has an inner surface and the upper shell has an upper shell side wall having an outer surface, said inner and outer surfaces being equipped with complementary fixing elements having opposing surfaces configured to prevent a translation against one another of the lower shell and of the upper shell in both a horizontal and vertical direction, wherein in that the recess has a concave shape facing the bottom of the lower shell.

2. The protective container according to claim 1, wherein the lower shell side wall elements have cavities forming said support elements, on which peripheral abutments of the upper shell rest.

3. The protective container according to claim 2, wherein the lower shell side wall is constituted of four side wall elements, at least three of the four side wall elements of the lower shell having cavities forming said support elements, on which the peripheral abutments of the upper shell rest.

4. The protective container according to claim 2, wherein the height of the cavities is less than the height of the side wall elements of the lower shell, such that there remains a distance at least equal to 1 centimeter between the upper end of the cavities and the upper end of the side wall elements of the lower shell.

5. The protective container according to claim 1, wherein inner surfaces of the side wall elements of the side wall of the lower shell comprise horizontal shoulders on which an edge of the upper shell can bear in an assembled state between the lower shell and the upper shell.

6. The protective container according to claim 5, wherein the fixing elements comprise clips.

7. The protective container according to claim 5, wherein the fixing elements are located on either side of an opening of the protective container, and/or along a side wall of the lower and upper shells of the protective container.

8. The protective container according to claim 5, wherein an inner surface of the side wall of the lower shell and an outer surface of the side wall of the upper shell are equipped with complementary fixing elements preventing a horizontal translation of the shells against one another.

9. The protective container according to claim 8, wherein the fixing elements comprise a set of lugs and of receptacles engaging together.

10. The protective container according to claim 1, wherein the upper shell is insertable in the lower shell so as to not exceed outside of the lower shell at the top.

11. The protective container according to claim 1, wherein the upper shell is shorter than the lower shell on at least some of the width thereof, making the inside of the container accessible from the outside, so as to define an opening.

12. The protective container according to claim 1, wherein a side wall element of the lower shell has at least one inclined portion at least at the level of the bottom of the lower shell.

13. The protective container according to claim 12, wherein the inclined portion is located at the level of a longitudinal end of the lower shell located at the level of the outlet of a bag tube.

14. The protective container according to claim 1, wherein the bottom of the lower shell is sealed and has a sufficient height to retain a water volume at least equal to one and/or the other of: 5 liters, 10 liters, 20 liters, 50 liters.

15. The protective container according to claim 1, wherein the lower shell comprises at least one abutment at the level of a longitudinal end located at the level of the outlet of a bag tube, a part of the outer perimeter of an opening of the upper shell coming into contact with said abutment.

16. The protective container according to claim 15, wherein the abutment comprises rounded edges.

17. The protective container according to claim 15, wherein the abutment comprises a trough extending from an edge of the abutment adjacent to the inclined portion of the lower shell to an edge of the abutment adjacent to the outer perimeter of the opening of the upper shell.

18. The protective container according to claim 1, wherein the upper shell comprises a plurality of cavities capable of receiving and retaining connectors of an end of a tube of the bag.

19. The protective container according to claim 18, wherein the cavities are arranged on either side of an opening of the upper shell, and/or arranged at an end opposite the opening.

20. The protective container according to claim 19, wherein the recess comprises an X-shape, so as to make it possible to retain tubes of the bag.

21. The protective container according to claim 1, wherein at least when the upper shell is inserted in the lower shell, structures are arranged around the reinforcement so as to be able to retain in place around the recess at least one tube of the bag.

22. The protective container according to claim 1, wherein the upper shell comprises at least one arch, extending between two side wall elements of the upper shell, advantageously between the two longest side wall elements.

23. The protective container according to claim 22, wherein the arch comprises a flat upper part, capable of receiving an outer surface of the bottom of a lower shell of another container.

24. The protective container according to claim 23, wherein the arch bears on the recess of the upper shell.

25. The protective container according to claim 24, wherein the flat upper part of the arches comprises a protrusion capable of being inserted in a cavity provided on an outer surface of the bottom of a lower shell of another container.

26. The protective container according to claim 12, wherein at least some of the side wall elements of the lower shell comprise a gripping zone, at least the inclined portion and the end opposite an opening comprising such a gripping zone, this gripping zone advantageously including several cavities spaced from one another.

27. The protective container according to claim 4, wherein the lower shells of different protective containers are capable of being stacked on one another, such that the fixing elements of the highest lower shells rest on the fixing elements of the lowest lower shells.

28. The protective container according to claim 4, wherein the upper shells of different protective containers are capable of being stacked on one another, such that the fixing elements of the highest upper shells rest on the fixing elements of the lowest upper shells.

29. The protective container according to claim 1, wherein the two of the longest side wall elements of the lower shell are inclined towards one another in the low parts thereof such that, when different protective containers are stacked on one another, a space is formed between two adjacent lower shells along these two adjacent lower shells so as to retain tubes accessible to a hand of an operator.

30. A protective assembly of a bag intended to receive a biopharmaceutical liquid comprising: a protective container according to claim 1, and an empty bag intended to receive the biopharmaceutical liquid placed in said protective container, inside the lower shell and covered by the upper shell.

31. The protective assembly according to claim 30, wherein the bag is retained at the longitudinal ends of the container, such that a front end of the bag abuts against an abutment of the lower shell, and the bag folded at an end opposite the outlet of the tube is crimped between the lower and upper shells.

32. The protective assembly according to claim 30, wherein the height of the lower shell is such that, in case of piercing the bag, all of a volume contained in the bag can be retained in the protective container.

33. A method for producing a protective container according to claim 1, wherein: the lower and upper shells are produced by thermoforming, the perimeters of the upper and lower shells are deburred, and there is at least no other cutting step.

* * * * *